United States Patent
Craft et al.

(10) Patent No.: US 7,433,265 B2
(45) Date of Patent: Oct. 7, 2008

(54) CONVERTED WAVE ENERGY REMOVAL FROM SEISMIC DATA

(75) Inventors: Kenneth L. Craft, Missouri City, TX (US); Bryan C. Keller, Missouri City, TX (US)

(73) Assignee: Fairfield Industries, Inc., Sugar Land, TX (US)

( * ) Notice: Subject to any disclaimer, the term of this patent is extended or adjusted under 35 U.S.C. 154(b) by 0 days.

(21) Appl. No.: 11/243,136

(22) Filed: Oct. 4, 2005

(65) Prior Publication Data

US 2007/0076525 A1  Apr. 5, 2007

(51) Int. Cl.
*G01V 1/36* (2006.01)

(52) U.S. Cl. .............. 367/38; 367/43; 367/44; 367/45; 367/52; 702/17

(58) Field of Classification Search .......... 367/24, 367/38, 43–46, 52; 702/17
See application file for complete search history.

(56) References Cited

U.S. PATENT DOCUMENTS

| | | | |
|---|---|---|---|
| 4,380,059 A | 4/1983 | Ruehle | |
| 4,611,311 A * | 9/1986 | Frasier | ............ 367/38 |
| 4,882,713 A * | 11/1989 | Hughes | ............ 367/47 |
| 5,067,112 A | 11/1991 | Meek et al. | |
| 5,191,526 A * | 3/1993 | Laster et al. | ............ 702/17 |
| 5,392,213 A * | 2/1995 | Houston et al. | ............ 702/17 |
| 5,771,203 A * | 6/1998 | Soubaras | ............ 367/46 |
| 6,263,284 B1 * | 7/2001 | Crider et al. | ............ 702/14 |
| 6,314,371 B1 * | 11/2001 | Monk | ............ 702/17 |
| 6,446,009 B1 * | 9/2002 | Baeten et al. | ............ 702/17 |
| 6,636,810 B1 * | 10/2003 | Moore et al. | ............ 702/17 |
| 6,738,715 B2 | 5/2004 | Shatilo et al. | |
| 6,826,484 B2 * | 11/2004 | Martinez et al. | ............ 702/14 |
| 6,873,913 B2 * | 3/2005 | Choo et al. | ............ 702/17 |

* cited by examiner

*Primary Examiner*—Jack W Keith
*Assistant Examiner*—Scott A Hughes
(74) *Attorney, Agent, or Firm*—Mark Tidwell; Jackson Walker L.L.P.

(57) ABSTRACT

Coherent wave noise energy is removed from seismic data by modeling both the P-wave primary energy and the coherent wave noise energy. The P-wave primary energy is modeled first and then subtracted from the input data. The data with the P-wave primary energy removed is used as the input for coherent wave energy removal. The coherent wave energy is modeled and subtracted from the original input data, i.e. the data input into P-wave primary removal. This leaves a dataset with P-wave primary energy and noise energy not related to coherent waves. This method can be utilized to remove all types of coherent noise with a velocity difference to the desired P-wave primary energy or with a different type of moveout (change of time of arrival with source-receiver distance) such as, for example, linear moveout.

36 Claims, 6 Drawing Sheets

CONVERTED WAVE ENERGY REMOVAL FROM SEISMIC DATA

BACKGROUND OF INVENTION

The present invention relates generally to the field of seismic exploration and, more particularly, to methods for removal of unwanted energy from seismic data. Most particularly, it relates to the removal of coherent wave energy from seismic data acquired by geophones, hydrophones or other sensors.

In the oil and gas industry, seismic prospecting techniques are commonly used to aid in the search for and evaluation of subterranean hydrocarbon deposits. Typically, the goal of seismic prospecting is to construct a two dimensional (2-D) or three dimensional (3-D) representation of a subsurface lithologic formation in order to identify features that are indicative of hydrocarbon accumulations. Seismic prospecting generally consists of three separate stages: data acquisition, data processing and data interpretation. The success of a seismic prospecting operation depends on satisfactory completion of all three stages.

In the first stage of seismic prospecting, namely, seismic acquisition, a seismic source, such as, for example, dynamite, is used to generate a downgoing seismic wavefield or signal that propagates into the earth and is partially reflected by subsurface seismic reflectors (i.e., interfaces between subsurface lithologic or fluid units having different elastic properties). The reflected or upgoing wavefield or signals (known as "seismic reflections") are detected by seismic receivers located at or near the surface of the earth, at or near the water surface, or at or near the seafloor. The detected signals are converted into electric signals and recorded, thereby generating a seismic survey of the subsurface. The recorded signals, or seismic energy data, can then be processed to yield information relating to the lithologic subsurface formations identifying such features, as, for example, lithologic subsurface formation boundaries. The seismic energy recorded by each seismic receiver for each source activation during the data acquisition stage is known as a "trace."

The seismic receivers utilized in such operations typically include pressure sensors, such as hydrophones, and velocity sensors, such as single or multi-component geophones. Utilizing a dual sensor configuration, namely, the combination of a geophone and a hydrophone, various summation techniques of the two types of wavefield recordings can be utilized to improve the accuracy of a trace.

With respect to the propagating wavefield, the two main ways in which seismic energy typically travels through the earth are either as compressional waves, commonly referred to as "P-waves", or as shear waves, commonly referred to as "S-waves". P-waves are body waves in which particle motion is in the direction of propagation. S-waves are body waves in which particle motion is perpendicular to the direction of propagation The term "body wave" refers to the fact that P- and S- waves can exist within a medium as well as at the boundary between media or lithologic units, in contrast to "boundary waves" that can exist only at a boundary. Both body waves and boundary waves consist of coherent energy. Coherent energy is energy that follows a particular path either within the subsurface or along the boundary between media or lithologic formations. Random or chaotic propagation is generally referred to as non-coherent noise. Coherent energy manifests itself as following a particular pattern, such as, for example, linear or hyperbolic patterns, across different types of data collections (sorts), e.g. shot, receiver or common depth point (CDP) sorts. Converted waves are a type of coherent energy that travels first as one type of wave, e.g. P-wave, and then as another, e.g. S-wave, the conversion between wave types occurring at the seismic reflectors. The most prevalent type of converted waves used in seismic exploration are "PS-waves" representing waves that are down-going into the earth as P waves and are reflected to the surface of the earth as S-waves. Another converted wave path for marine data would be the PSP-wave path where the wave travels into the earth as a P-wave and is reflected upward at some depth within the earth as an S-wave. This S-wave is then converted to a P-wave at the sea floor and is recorded as a P-wave by hydrophones near or at the water surface. It is well known that geophones can detect both P- and S-waves, while hydrophones are capable of only detecting P-waves. In part because of this, geophone data is historically "nosier" than hydrophone data. More specifically, geophone data can be contaminated with both S-waves and P-waves, while hydrophone data can only sample P-waves. For coherent energy noise removal, it is necessary to consider both P-wave and S-wave data detected by the sensors as energy from both types of detectors can be coherent.

Once the seismic data has been acquired, it is then processed during the second stage of seismic prospecting in part to remove unwanted energy. For example, in dual sensor acquisition, wave energy recorded by the hydrophones and by the geophones can be combined to minimize the effect of the reflection of energy by the water surface, often referred to as ghosts. Seismic processing typically involves the use of various mathematical algorithms that are applied to the data to enhance its signal content and to make it more amenable to interpretation. One of the main objectives of the data processing stage is to remove or at least attenuate unwanted recorded energy that contaminates the primary seismic signal. This unwanted energy is typically referred to as "noise", and represents such things as, for example, multiple energy, i.e. energy that has reflected more than once from a reflector, electrical interference, noise caused by cultural factors such as oil drilling rigs, wind noise, etc.

Techniques for noise removal such as common-midpoint (CMP) or common depth point (CDP) stacking (the term CDP will be used in this application for the collection of traces obtained at one surface location), deconvolution, frequency filtering, multiple attenuation, and pre-stack and post-stack migration, etc., are well known in the industry. Generally the traces common to a surface location will have common characteristics that can be capitalized upon in order to remove noise. These traces will generally have the averages of the x and y coordinates of the shot and receiver in common or very close. Through such processing techniques, the strength of the primary signal energy represented in a trace can be enhanced, while the strength of the unwanted noise energy can be weakened, thus increasing the signal-to-noise, or S/N, ratio. Among the noise energy that can be removed with these procedures is coherent wave noise energy. In this regard, it is generally desirable to suppress coherent wave noise energy in favor of the pure-mode P-wave primary energy. The term "P-wave primary energy" is used to differentiate between primary and multiple energy, i.e. energy that has bounced back from the reflector once (primary) as opposed to energy that has taken more than one path in the subsurface (multiple), to differentiate between P- and S-waves and to differentiate between true reflectors and other types of signals such as linear noise trains.

Various attempts have been made in the prior art to remove coherent wave noise energy from a P-wave primary seismic signal. For example, the velocity difference between the P-wave primary signal energy and the coherent wave noise energy can be utilized for such processing. Generally the velocity of the coherent wave noise energy will be less or of a different type, e.g. hyperbolic versus linear, than the velocity of the P-wave primary energy. For hyperbolic moveout a velocity can be chosen for normal moveout (NMO) correction, i.e. time corrections that change the time position of energy from a reflector as a function of offset, shot to receiver distance. When the velocity to a particular reflector is correct, the energy from that reflector after NMO, appears at a constant time in a data sort that spans several offsets. Typically, for example, it is desirable to select the correct velocity so that P-wave primary energy reflectors appear at a constant time in a data sort, i.e., the P-wave primary energy is flat. However, a velocity can be chosen such that the P-wave primary energy is overcorrected, i.e. curves upward, and the coherent wave noise signal is undercorrected, i.e. curves downward. CDP, shot and receiver sorts, for example, all have a range of offsets and would exhibit this behavior. If the velocity for NMO is too slow for a reflector, the reflector after NMO in one of these sorts will curve upward. If the velocity is too fast the reflector will curve downward. For geophones, some coherent wave noise energy is organized in the receiver domain but unorganized in the shot or CDP domain. For example, the sensing of S-waves by geophones depends on the orientation of the geophone with respect to the upcoming wave, i.e. the angle of the geophone with the material underlying the geophone. This will be geophone (receiver) consistent but not shot or CDP consistent. Hence by sorting the seismic data into a receiver sort, i.e. all the traces going into a particular receiver, and NMO correcting with a velocity between the P-wave data and converted wave data, the P-wave primary data will be overcorrected and the converted wave data will be under corrected. A decomposition technique such as frequency-wavenumber (F-K) filtering or tau-p (Radon) filtering can then be used to separate the undercorrected and overcorrected energy. For example, utilizing tau-p filtering, undercorrected energy, i.e. energy curving downward in a NMO corrected receiver gather, will map to the positive moveout section of the Radon space. Overcorrected energy, i.e. energy curving upward, will map to the negative moveout portion of the Radon space. Whichever filtering technique is used, the procedure transforms the NMO corrected data into a transform space where the undercorrected and overcorrected energy separate. Then the portion of the transform plane corresponding to undesirable data is strongly reduced in magnitude, i.e. filtered out. The remaining data is transformed back into X-T space. This is the method discussed in U.S. Pat. No. 6,738,715.

Other patents pertaining to this area of seismic data processing are as follows. U.S. Pat. No. 5,191,526 teaches FK filtering to separate signal and noise and uses wavenumbers, decay constants, amplitudes and phases to discriminate between P-wave primary data and coherent noise. In another embodiment in this patent, the noise areas of the FK plane are summed together and subtracted from the input data. U.S. Pat. No. 5,067,112 teaches frequency-distance, FX, filtering to determine the frequencies at which coherent noise resides, wherein wavenumbers corresponding to such frequencies are removed by filtering. U.S. Pat. No. 4,380,059 pertains more to multiple removal but uses an FK inverse filter to remove portions of the FK plane pertaining to multiples.

SUMMARY OF THE INVENTION

The present invention provides a method for removal of coherent wave energy that appears as a form of noise, i.e. undesirable signals, within seismic data. For example, in the case of PS or PSP ray paths, coherent wave noise energy can interfere with the desired P-wave primary energy. In an example utilizing dual sensor acquisition (hydrophones and geophones), the coherent wave noise energy can be removed before the subsequent process of dual sensor summation, yielding a superior S/N ratio data for subsequent processes, such as deconvolution, migration, etc. In short, the method involves the removal of the coherent wave noise energy from the data recorded by hydrophones, geophones or other types of sensors. For converted waves, it is much more likely that this process will be carried out on geophone data. But both for converted waves and other types of coherent noise, it is also contemplated that hydrophone data could also be treated in the manner described herein, as,. for example, raypaths involving the conversion of converted waves (S-waves) back to P-waves at the sea floor. In this case, such a wave would travel into the subsurface as a P-wave, be reflected as an S-wave at the reflector and then be converted back to a P-wave at the sea floor. For the forgoing reasons, as used herein, the term "sensor" is defined to mean any receiver of the seismic energy irrespective of whether the receiver is a hydrophone, a geophone or some other type of energy detection device.

More specifically, the method of the invention involves modeling the P-wave primary energy and coherent wave noise energy in order to remove coherent wave noise energy from the sensor data. First, the sensor data is sorted into CDP order and a P-wave primary velocity analysis is conducted. Utilizing the selected velocity, normal moveout (NMO) with the P-wave primary velocity is applied. This "flattens" the P-wave reflector energy. P-wave reflection data is then modeled to yield data with the P-wave primary energy strongly enhanced. This reflected P-wave primary data is then subtracted from the original "mixed wave" input data, i.e. data containing P-wave primary energy, coherent wave noise energy and other types of noise energy, to generate a dataset representing the coherent wave noise energy and other noise energy, i.e. the original data minus the desired P-wave primary energy.

Velocity analysis is thereafter conducted on the dataset consisting of coherent wave noise energy and other noise. For the case of geophone data and converted waves, this analysis is done on the data sorted to a receiver sort. For other types of coherent noise, the velocity analysis can be done in other sorts, e.g. CDP sorts. This velocity analysis will give the coherent wave noise energy velocity distribution. Next, the converted wave noise velocity NMO, or other types of moveout such as, for example, linear moveout, is applied to the converted wave noise data and a filter is applied to attenuate all data representing energies, i.e. other types of noise, that are not coherent wave noise energy. This effectively models the coherent wave noise energy. Thereafter inverse moveout is applied to the coherent wave noise energy and the result is subtracted from the original sensor signal to yield a processed sensor signal that is comprised only of P-wave primary energy and various noise energy other than that attributable to the particular coherent noise energies that have been removed. For linear noise trains, linear moveout can be used to flatten this type of coherent noise. While S-wave converted noise energy has been used as a primary example described herein, those skilled in the art will understand that the invention can be used with any type of coherent wave energy for which removal is desired. Thus, the above-described sequence can be repeated to remove other types of coherent wave noise energy. In any event, once coherent wave noise energy has been removed, the data at this point can then be further processed utilizing techniques known in the art to remove the other types of noise still remaining in the data.

The inventive process described herein is desirable over the prior art because it utilizes modeling techniques and subtractive techniques, as opposed to basic transform filtering, in order to remove coherent wave noise energy from the original sensor signals. This results in a more precise subtraction of the converted wave energy.

DESCRIPTION OF THE PREFERRED EMBODIMENTS

In describing the preferred embodiments, for convenience, the Figures referenced herein are one side, positive or negative offset (source to receiver distance) of a sort in which the coherent wave noise energy follows a hyperbolic path across the sort and represent a receiver sort for converted wave energy sampled by a geophone. As such, the sort is receiver constant for purposes of the illustration. However, those skilled in the art will understand that the inventive process described herein will work for other types of coherent noise as well.

Figure 1:
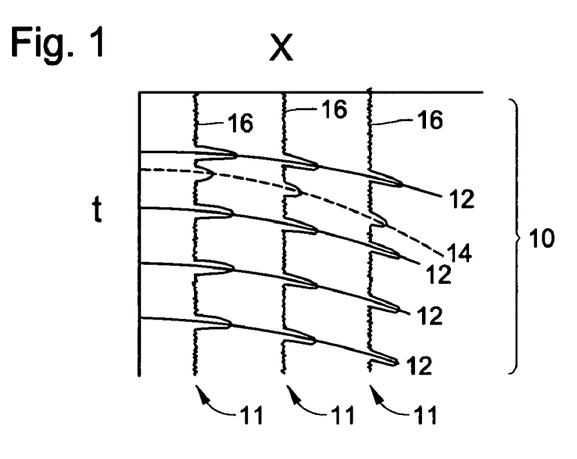
FIG. 1 is a typical display of original sensor data prior to any processing to remove coherent wave noise energy.

With reference to FIG. 1, there is shown a time-offset ("T-X") display of original sensor data 10 in an unprocessed format. Data 10 is comprised of individual traces 11. For converted waves sampled by a geophone, the displays correspond to receiver sorts with half the sort shown, i.e. positive or negative offsets only. This is done because converted waves for geophone data will be receiver consistent rather than shot or CDP consistent and hence will only show continuity in the receiver sort. Other types of coherent wave noise energy would be coherent in other types of sorts such as shot, CDP, etc. In FIG. 1, the original sensor data 10 is comprised of reflected P-wave primary energy 12, coherent wave noise energy 14 and random noise energy 16. None of the seismic energy components, whether reflected energy 12, converted wave energy 14 or random noise energy 16, such as, for example, wind noise, have been processed for purposes of FIG. 1.

The method of the invention is a process for removing the coherent wave noise energy 14 from data 10, leaving just reflected energy 12 and random noise energy 16, the jitter on the trace. Thereafter, noise energy 16 may be removed utilizing methods that are known in the industry. In the case of dual sensor acquisition, removing coherent wave noise energy 14 prior to the subsequent process of dual sensor summation will yield superior signal to noise ratio data to which other processing techniques can be applied, such as, for example, deconvolution or pre-stack migration.

In the most general terms, the method of the invention involves modeling of the desired signal data, P-wave primary reflected energy 12, and the undesired coherent wave noise energy data 14. One aspect of the method of the invention models P-wave primary reflected energy 12 and removes this modeled reflected energy 12 from the original data 10. Thereafter, coherent wave noise energy modeling is performed on the data with the P-wave primary reflector energy removed and this modeled coherent wave noise energy is removed from the original data 10. These steps preserve the integrity of the P-wave reflected energy signal, especially at near offsets. An additional aspect of the method of the invention is to identify and utilize coherent wave noise energy velocities to apply time corrections to flatten the coherent wave noise energy 14 so that this energy can be more easily identified and removed from original data 10.

Turning to the specific method of the invention, in most cases, data from a seismic survey is obtained utilizing geophones, hydrophones or a geophone-hydrophone combination (dual sensor acquisition). In the case of converted waves it is generally only the geophone data that is processed in the manner described herein, but those skilled in the art will appreciate that other types of coherent wave energy noise present in data from other sensors could benefit from this approach. For example, in the case of converted wave energy changed back to P waves at the seafloor, converted wave energy could be detected with a hydrophone.

Figure 2:
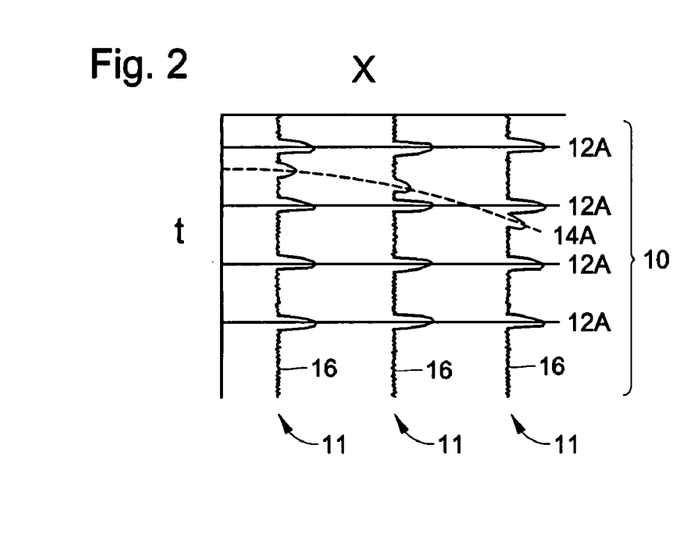
FIG. 2 is a display of original sensor data to which P-wave primary NMO has been applied.

The original data 10 is first sorted into a CDP sorted and thereafter, a P-wave primary velocity analysis on the data is carried out. After this velocity field is determined, P-wave primary velocity NMO correction is applied to the data to yield P-wave primary NMO corrected data 12A as shown in FIG. 2. The P-wave primary velocity for NMO correction is selected based on reflected energy 12. After NMO, P-wave primary corrected reflected energy 12A will appear in the T-X domain as substantially horizontal, as is also illustrated in FIG. 2. Since the P-wave primary velocity is derived from the reflected energy 12, other types of energy within data 10, such as P-wave primary velocity NMO corrected coherent wave noise energy 14A will be overcorrected or undercorrected. The random noise will not be coherent in any sort and will not have energy lineups. As stated previously, overcorrected energy will appear in the T-X domain with a more pronounced upward curvature and undercorrected energy in the T-X domain will appear with a more pronounced downward curvature. In FIG. 2, NMO corrected P-wave primary reflected energy 12A is shown as being substantially horizontal. The coherent wave noise energy 14A NMO corrected using the P-wave primary velocity is shown as being undercorrected. This occurs because the velocity of P-wave primary reflected energy 12 is typically significantly faster than the velocity of the most common types of coherent wave noise energy 14, converted waves and multiples. Because the P-wave primary velocity of the reflected energy 12 is significantly faster than the velocity of converted wave energy 14, the corrected P-wave primary reflected energy 12A and the corrected noise energy 14A can be modeled into separate components using processes that will discriminate between the different wave energies.

Figure 3:
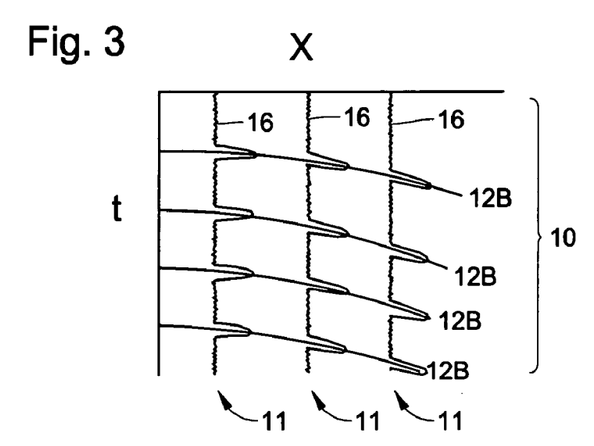
FIG. 3 is a display of P-wave data represented in the original sensor data after modeling and inverse NMO.

The process that models the P-wave primary velocity in the preferred embodiment is as follows. At this point the input data has been sorted to CDP sort for velocity analysis. The velocity analysis for P-wave primary energy has been carried out and the CDP sorted data has been NMO corrected using the determined P-wave primary velocities. This "flattens" the P-wave primary data, i.e. causes the valid P-wave primary reflectors to occur at a constant time across all offsets (source-receiver distances). Amplitude values are then obtained across, i.e. at constant times, the traces 11 with different offsets within the CDP. The amplitude values in a time window are then collected. The logarithms of these values are calculated. A percentage of high and low values (outliers) are removed and then the average of the remaining values is determined. This average is then exponentiated to obtain a reference power or amplitude. Other embodiments of this process would use a simple average of amplitude or power values or RMS averaging to determine the reference amplitude or power. From this reference amplitude or power, multiplicative factors are determined to increase or decrease the amplitude or power values of the original amplitudes. After these multiplicative factors have been applied, the outlier values will have been brought more into alignment with the other amplitude values in the constant time sampling. This will discriminate against data not in a horizontal alignment with time, i.e. cutting across the P-wave primary velocity NMO corrected events. This will create data strongly dominated by the P-wave primary energy with very little of other types of energy, e.g. coherent wave noise energy. Hence the resulting output of this step consists of modeled P-wave primary energy. This method of energy removal will be referred to herein as "diversity editing". Next an inverse NMO is applied and the modeled P-wave data, which is illustrated in FIG. 3 as inverse NMO modeled P-wave data 12B, is subtracted from the input data, resulting in the data set represented by FIG. 4. The subtraction used in this step is referred to as "adaptive subtraction" and consists of applying a matching filter between the data sets, the original data and the modeled P-wave primary data, before subtraction is done. In another embodiment of the process, regular subtraction could be used. In any event, following this subtraction process, the data set of FIG. 4 comprises the input data with P-wave primary energy removed, i.e. a dataset composed of coherent wave noise energy 14B and other types of interfering energy (noise) 16B.

Figure 4:
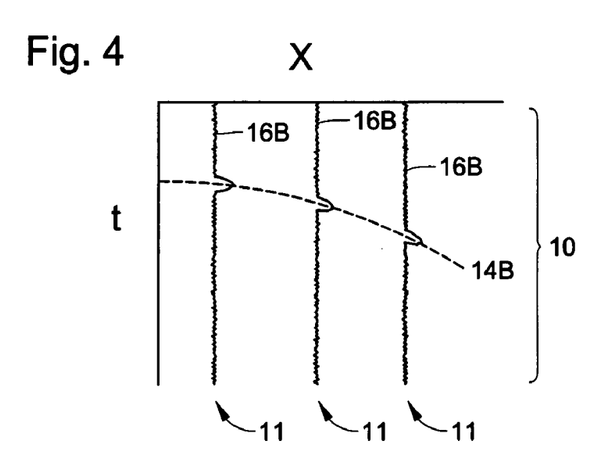
FIG. 4 is a display of coherent wave noise data that has been extracted from the original sensor data by removal of the P-wave primary data in FIG. 3.
Figure 5:
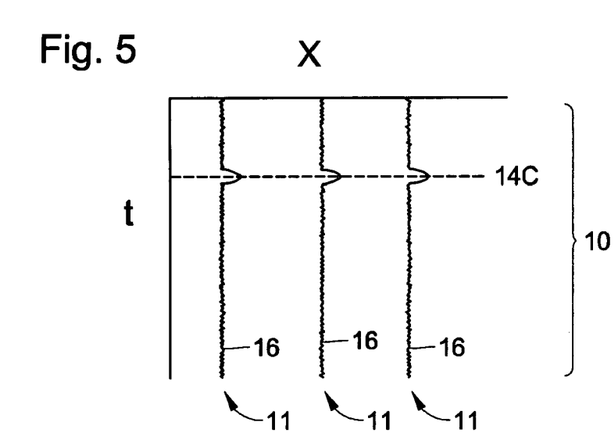
FIG. 5 is a display of coherent wave noise data to which NMO has been applied using the coherent wave noise data velocity.

In the next step of the process, the coherent wave noise energy is modeled. For converted wave modeling carried out by a geophone, the data must be in receiver sort. First coherent wave noise energy velocity analysis is carried out. The data input into this will be, for converted wave geophone data, a receiver sorted dataset with the P-wave primary energy removed. For other types of coherent wave noise energy, other types of sorts may be utilized. In any event, after the coherent wave noise energy velocities are determined by a velocity analysis of the data, the data of FIG. 4 are time corrected with the coherent wave noise energies velocities to obtain flat reflectors 14C for the coherent wave noise energy across the offset range resulting in the data illustrated in FIG. 5.

Figure 6:
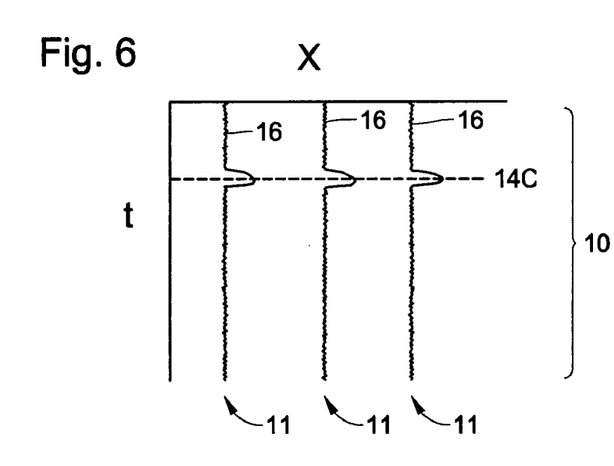
FIG. 6 is a display of coherent wave noise data to which an enhancement of the horizontally appearing energy has been applied.
Figure 7:
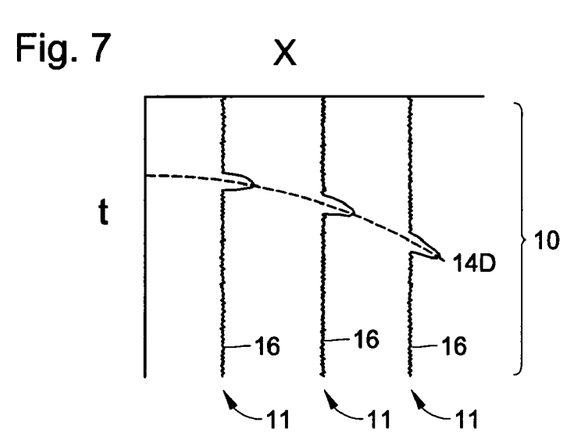
FIG. 7 is a display of coherent wave noise energy to which inverse NMO has been applied.
Figure 8:
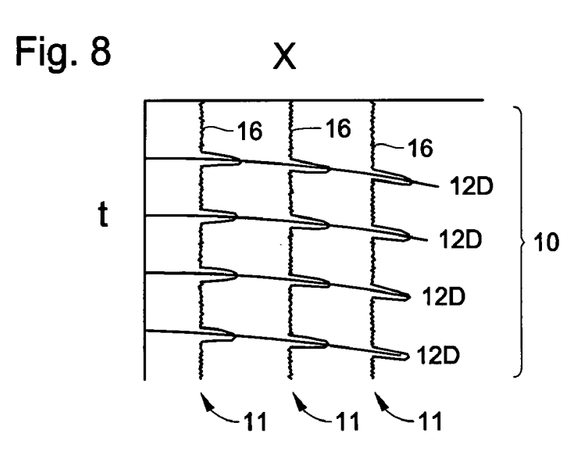
FIG. 8 is a display of original sensor data from which coherent wave noise data has been subtracted.

Next the data is transformed into another domain which can discriminate between flat-lying data and other data, e.g. frequency-wavenumber (F-K), tau-p (Radon), Karhunen-Loeve (eigen value), diversity editing, etc. Then a filter is derived to yield the data set illustrated in FIG. 6 in which all data except the flat-lying or nearly flat-lying data corresponding to the converted wave energy 14C has been removed. An inverse transform is then applied to move the data back into the T-X plane and inverse moveout is applied to yield the modeled coherent wave noise energy 14D as shown in FIG. 7. This creates the modeled coherent wave noise energy data. This modeled converted wave noise energy data 14D is then adaptively subtracted from the initial input data 10 of FIG. 1, i.e. the input data to P-wave primary modeling, to remove the coherent wave noise energy. In another embodiment of the inventive process, regular subtraction can be used. The output of this process will be a dataset, such as is illustrated in FIG. 8, comprising P-wave primary data and data other than the particular coherent wave noise energies removed by the process, i.e. other types of noise energy. At this point subsequent processes can be applied to the data to remove or attenuate the other types of noise in the data. If there are other coherent wave noise energies, the above procedure can be applied again to the data.

Figure 9:
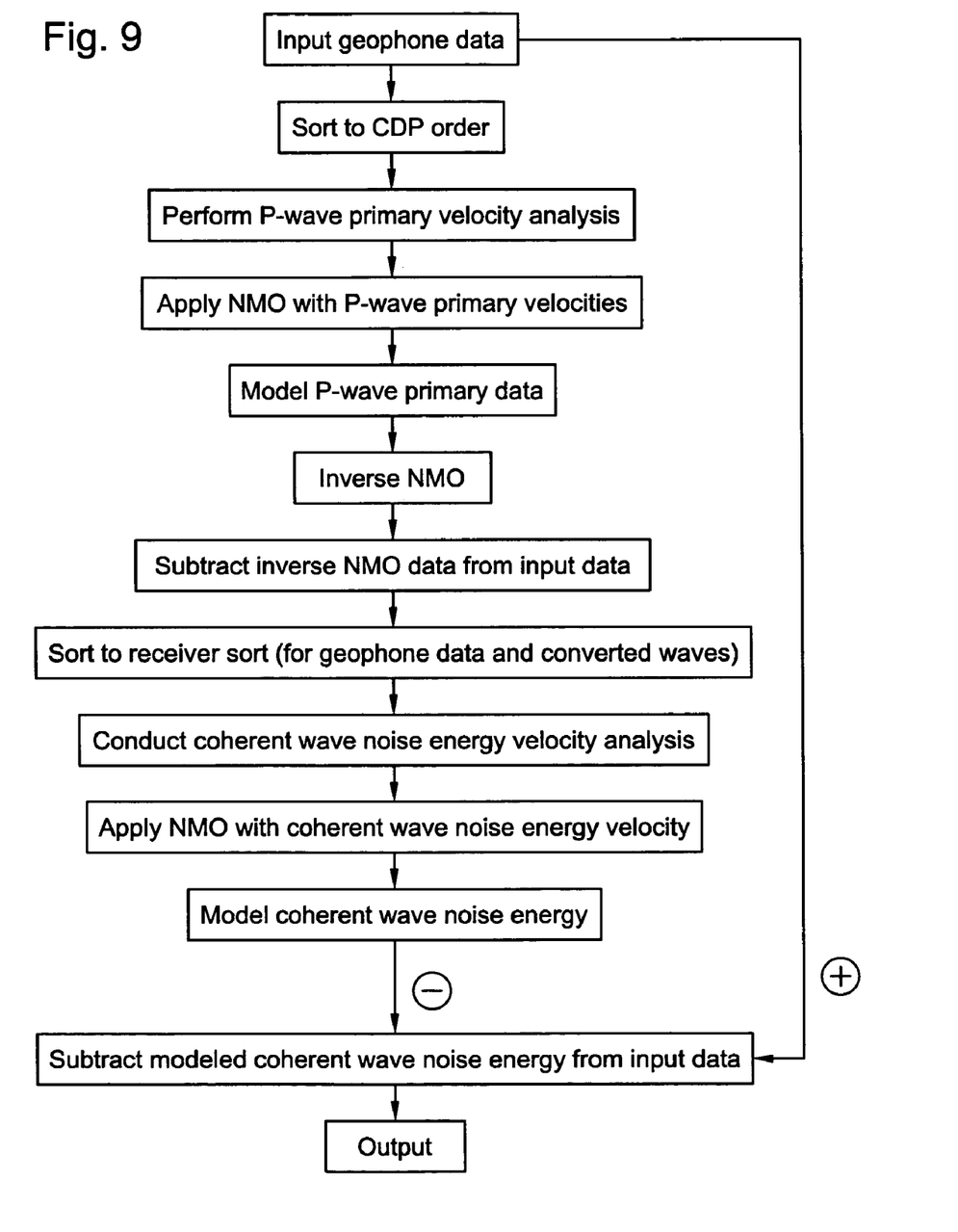
FIG. 9 is a flow diagram representing the steps in the inventive process.
Figure 10:
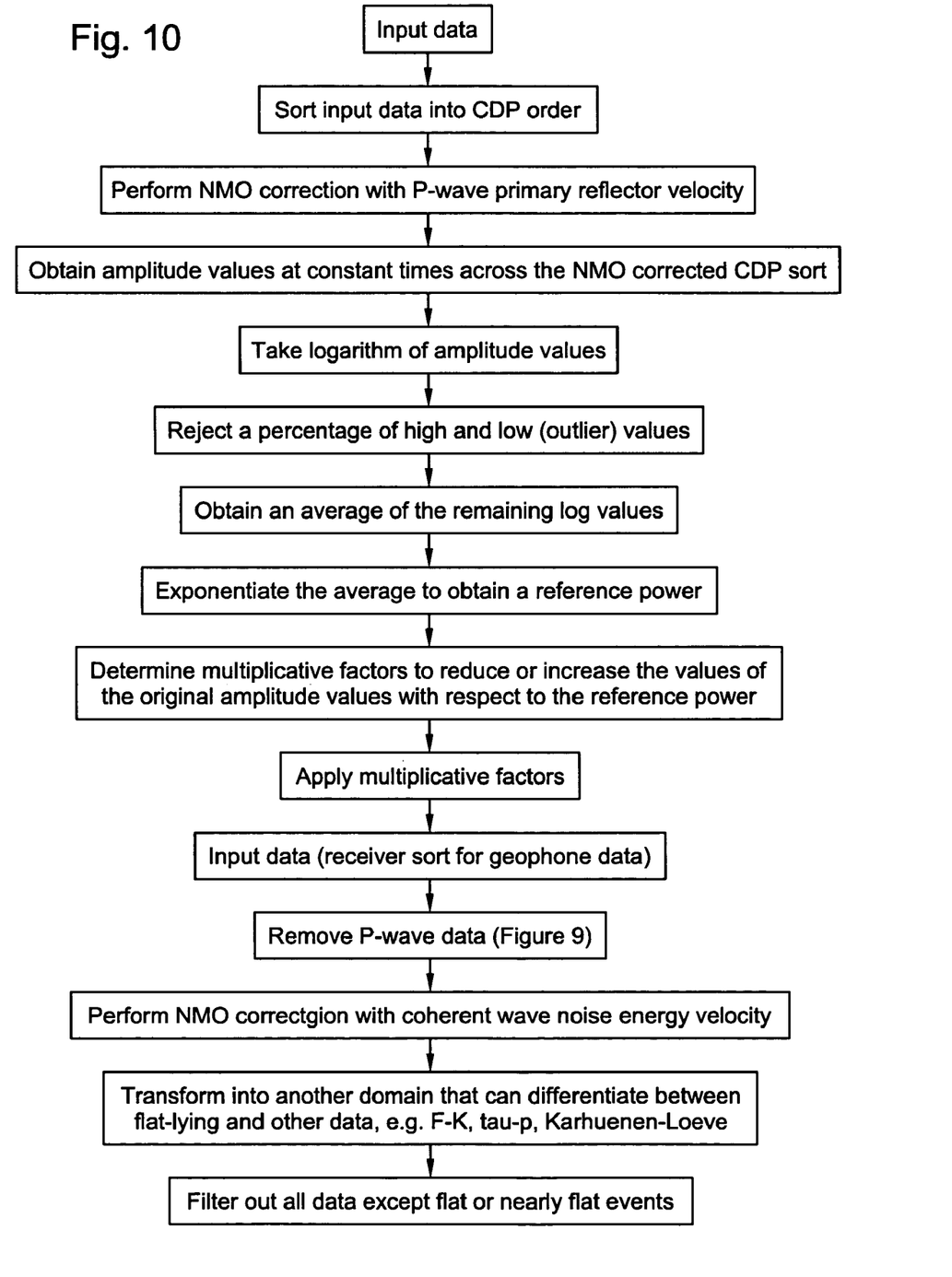
FIG. 10 is a flowchart illustrating the step of coherent wave energy modeling of the invention.
Figure 11A:
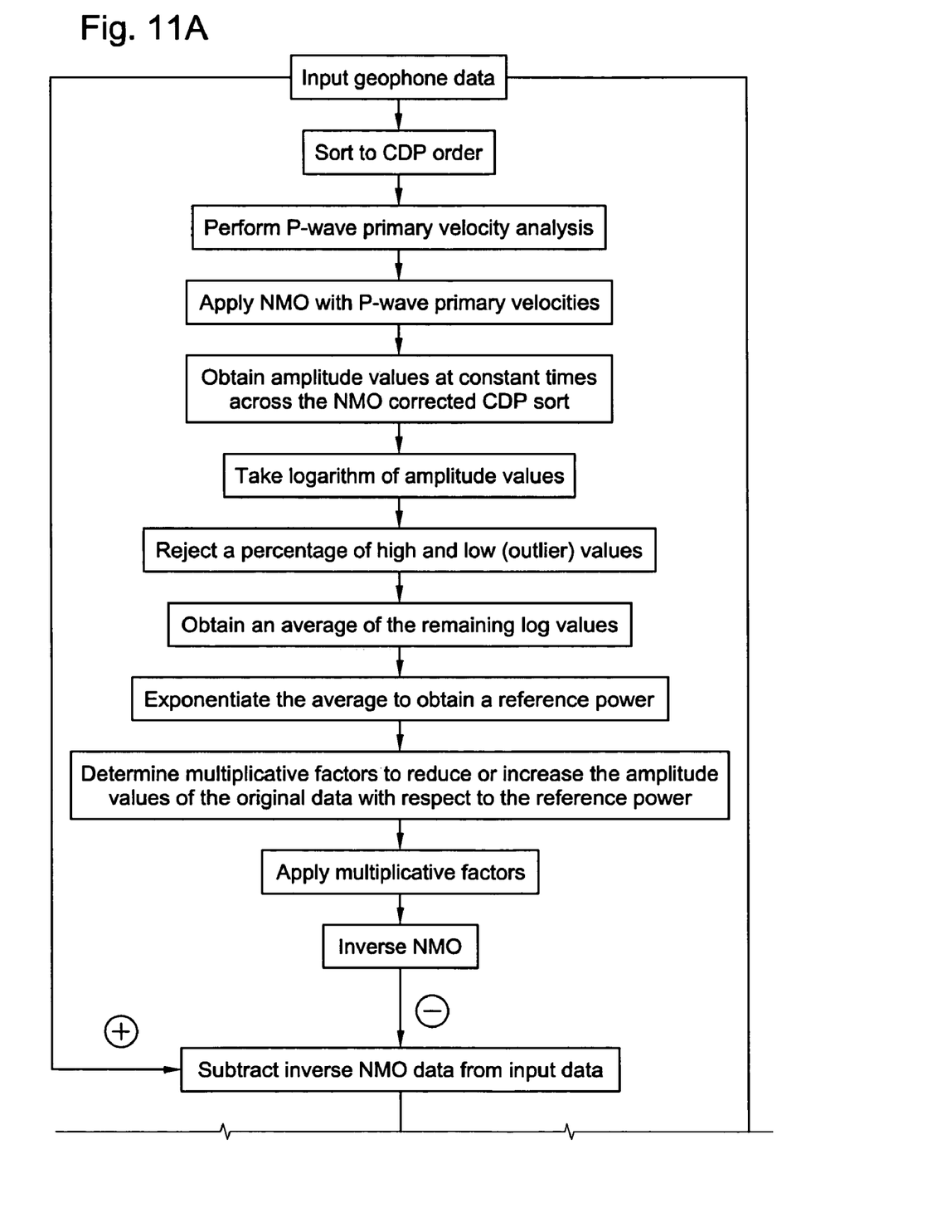
FIG. 11 is a flowchart illustrating the overall removal process of coherent wave noise energy from seismic data utilizing the modeling technique of the invention.
Figure 11B:
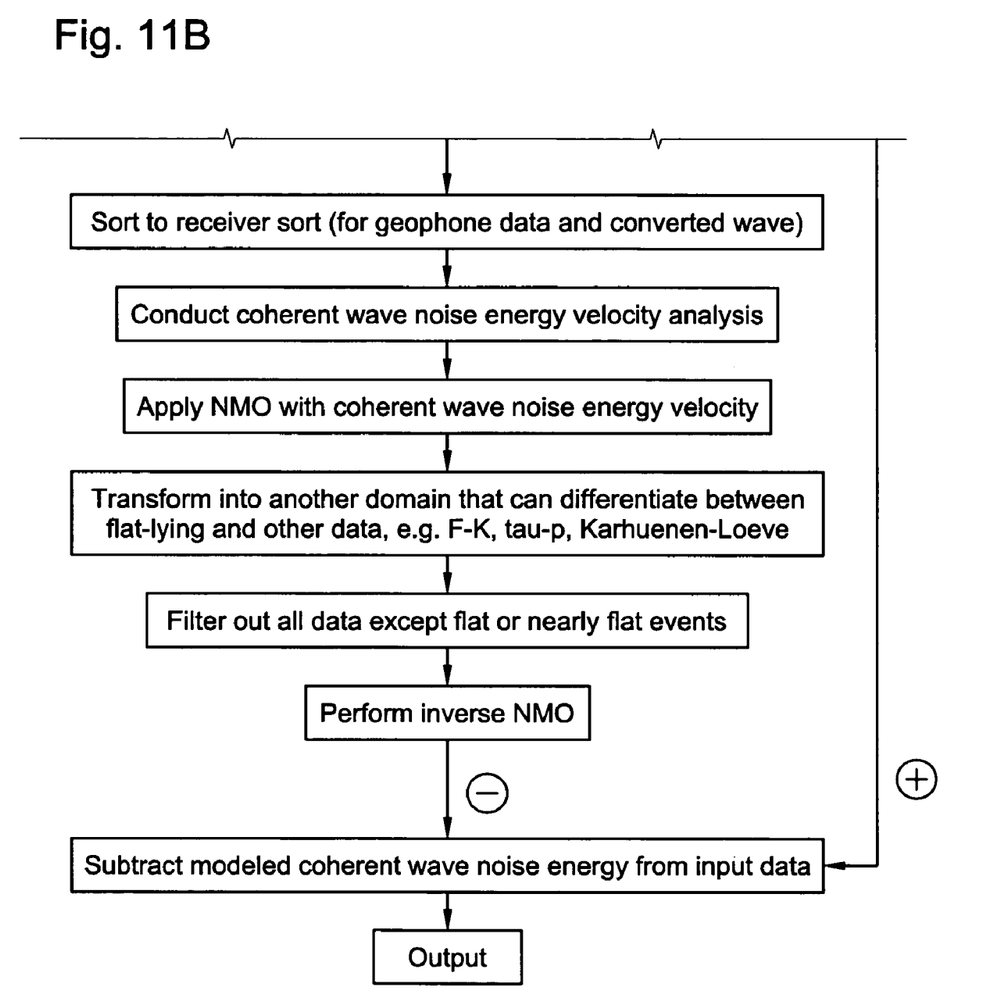

FIG. 9 represents a flowchart illustrating the step of reflected energy modeling. FIG. 10 represents a flowchart illustrating the step of coherent wave noise energy modeling. FIG. 11 represents a flowchart illustrating the overall removal process of coherent wave noise energy from seismic data utilizing the modeling technique of the invention. None of the prior art procedures model both the signal data and the coherent wave noise data and utilize such modeling to subtract the coherent wave noise data from the input data by a subtraction.

While certain features and embodiments of the invention have been described in detail herein, it will be readily understood that the invention encompasses all modifications and enhancements within the scope and spirit of the following claims. For example, if the desired result was a converted wave energy section, the process could be halted after the P-wave energy removal.

The invention claimed is:

1. A method of processing seismic data detected by a vertical geophone sensor, said method comprising the steps of:
   a. providing original seismic signal data comprised of a P-wave primary reflection signal component, random noise, and at least one converted wave noise energy component;
   b. modeling the P-wave primary reflection signal in common midpoint gathers to enhance flat lying events of the P-wave signal in the x-t domain;
   c. applying normal moveout to the original seismic signal data utilizing the modeled P-wave primary reflection signal;
   d. removing the modeled P-wave primary reflection signal from the original seismic data to yield a transitory signal which includes converted wave noise energy;
   e. sorting the results of step d into common receiver order;
   f. utilizing the transitory signal to model the converted wave noise energy to enhance flat lying events of the converted wave noise energy in the x-t domain in common receiver gathers;
   g. subtracting the modeled converted wave noise energy from the original seismic data.

2. The method of claim 1 further comprising the step of discriminating between the flat-lying P-wave primary reflection signal and other types of seismic energy prior to removing the modeled P-wave primary reflection signal from the original seismic data.

3. The method of claim 2 wherein the step of discriminating is accomplished using the method of diversity scaling.

4. The method of claim 2 wherein the step of discriminating is accomplished using F-K (frequency-wavenumber) filtering.

5. The method of claim 2 wherein the step of discriminating is accomplished using tau-p modeling.

6. The method of claim 1 wherein the step of subtraction is adaptive subtraction.

7. The method of claim 1 further comprising the step of CDP sorting the input data.

8. The method of claim 1 further comprising the step of receiver sorting the input data.

9. The method of claim 1 further comprising the step of shot sorting the input data.

10. The method of claim 1 further comprising the step of discriminating between the flat-lying converted wave noise energy and other types of seismic energy in the transitory signal prior to subtracting the modeled converted wave noise energy from the original seismic data.

11. The method of claim 10 wherein the step of discriminating is accomplished using F-K filtering.

12. The method of claim 10 wherein the step of discriminating is accomplished using tau-p modeling.

13. The method of claim 10 wherein the step of discriminating is accomplished using diversity scaling.

14. The method of claim 1 wherein linear moveout is used to model the converted wave noise energy.

15. A method of processing seismic data containing converted waves detected by a geophone, said method comprising the steps of:
   a. providing original seismic signal data comprised of a P-wave primary reflection signal component, random noise and at least one converted wave noise signal component;
   b. modeling the P-wave primary reflection signal to enhance flat lying events of the P-wave signal;
   c. removing the modeled P-wave primary reflection signal from the original data to yield a transitory signal which includes converted wave noise energy;
   d. sorting the output data of Step C to a common receiver sort;
   e applying converted wave normal moveout using the primary wave velocity to the sorted data of Step D;
   f. utilizing the transitory signal to model the converted wave noise energy thereby enhancing flat lying events of the converted wave noise energy;
   g. subtracting the modeled converted wave noise energy from the original seismic data.

16. The method of claim 15 further comprising the step of discriminating between the flat-lying P-wave primary reflection signal and other types of seismic energy prior to removing the modeled P-wave primary reflection signal from the original data.

17. The method of claim 16 wherein the step of discriminating is accomplished using the method of diversity scaling.

18. The method of claim 16 wherein the step of discriminating is accomplished using F-K (frequency-wavenumber) filtering.

19. The method of claim 16 wherein the step of discriminating is accomplished using tau-p modeling.

20. The method of claim 15 wherein the step of subtraction is adaptive subtraction.

21. The method of claim 15 further comprising the step of receiver sorting the input data.

22. The method of claim 15 further comprising the step of discriminating between the flat-lying converted wave noise energy and other types of seismic energy in the transitory signal prior to subtracting the modeled converted wave noise energy from the original seismic data.

23. The method of claim 22 wherein the step of discriminating is accomplished using F-K filtering.

24. The method of claim 22 wherein the step of discriminating is accomplished using tau-p modeling.

25. The method of claim 22 wherein the step of discriminating is accomplished using diversity scaling.

26. A method of processing seismic data detected by a geophone, said method comprising the steps of:
   a. Providing original seismic signal data comprised of a P-wave primary reflection signal component, random noise, and a converted wave signal component;
   b. Sorting the original seismic signal data into CDP order;
   c. Identifying a velocity of the P-wave signal;
   d. Applying NMO to the sorted data based on the P-wave signal velocity to generate an interim seismic signal data comprised of a corrected P-wave signal component and an overcorrected or undercorrected converted wave signal component and random noise;
   e. Utilizing diversity scaling to enhance the flat lying events after NMO;
   f. Applying inverse NMO utilizing the velocity of the P-wave signal to the remaining interim seismic signal data to yield a processed P-wave primary signal component;
   g. Subtracting the processed P-wave primary signal component from the original seismic signal data to yield a processed converted wave signal component plus random noise;
   h. Conducting velocity analysis on the processed converted wave signal component;
   i. Applying NMO correction to the processed converted wave signal component;
   j. Sorting the processed reflection signal component into receiver order;
   k. Separating the NMO corrected data of Step (i) from the sorted data of Step (j);
   l. Applying inverse NMO correction to the result of Step (k); and
   m. Subtracting the output of Step (l) from the original seismic signal data.

27. A method of processing seismic data detected by a geophone, said method comprising the steps of:
   a. providing an original seismic signal comprised of a primary reflection signal component and a converted wave signal component;
   b. modeling the primary reflection signal component to enhance the flat lying events of the primary reflection signal component;
   c. removing the modeled reflection signal from the original seismic signal to yield a transitory signal;
   d. sorting the transitory signal to common receiver domain;
   e. modeling the converted wave noise energy signal component of the transitory signal to enhance the flat lying events of the converted wave noise energy signal component;
   f. applying converted wave NMO to the modeled converted wave signal component to yield a flattened, processed converted wave signal; and
   g. subtracting the processed converted wave noise energy signal from the original seismic signal.

28. The method of claim 27, further comprising the step of enhancing the flat lying events of step (b) by attenuating the random noise component of the primary reflection signal component.

29. The method of claim 27, further comprising the step of enhancing the flat lying events of step (e) by attenuating the random noise component of the converted wave noise energy signal component.

30. A method of processing seismic data detected by a seismic sensor, said method comprising the steps of:
   a. Providing original seismic signal data comprised of a P-wave primary reflection signal component, a random noise component, and a converted wave noise component;
   b. Sorting the original seismic signal data into CDP order;
   c. Identifying a velocity for the P-wave signal which velocity would produce P-wave flat lying events;
   d. Applying NMO to the sorted data based on the P-wave signal velocity to generate an interim seismic signal data comprised of a corrected P-wave signal component, an overcorrected or undercorrected converted wave noise component and a random noise component;
   e. Enhancing the flat lying events after NMO by attenuating the random noise component of the interim seismic signal data;
   f. Applying inverse NMO utilizing the velocity of the P-wave signal to the remaining interim seismic signal data to yield a processed P-wave primary signal component;
   g. Subtracting the processed P-wave primary signal component from the original seismic signal data to yield a processed converted wave noise component plus random noise;
   h. Sorting the results of Step G into receiver order;
   i. Conducting converted wave velocity analysis on the processed converted wave noise component;
   j. Applying converted wave NMO correction to the sorted results of Step H;
   k. Isolating the converted wave noise component in the results of Step J;
   l. Applying inverse NMO correction to the result of Step K; and
   m. Subtracting the output of Step L from the original seismic signal data.

31. A method of processing seismic data detected by a seismic sensor, said method comprising the steps of:
   a. Providing original seismic signal data comprised of a P-wave primary reflection signal component, a random noise component and a converted wave noise component;
   b. Flattening the P-wave primary reflection signal component through application of P-wave normal moveout;
   c. Isolating the P-wave primary reflection signal component from the random noise component and converted wave noise component;
   d. Removing the isolated P-wave primary reflection signal component from the original seismic signal data to yield an interim data set comprising a random noise component and a converted wave noise component;
   f. Sorting the interim data set into common receiver order;
   g. Flattening the converted wave noise component of the sorted results through application of converted wave normal moveout;
   h. Isolating the converted wave noise component in the sorted results from the random noise component; and
   i. Subtracting isolated converted wave component from the original seismic data.

32. A method of processing seismic data detected by a vertical geophone seismic sensor, said method comprising the steps of:
   a. Providing original seismic signal data comprised of a P-wave primary reflection signal component, a random noise component and a converted wave noise component;
   b. Sorting the original seismic signal data into CDP order;
   c. Identifying a velocity of the P-wave signal that would enhance flat lying events of the P-wave signal;
   d. Applying NMO to the sorted data using the identified P-wave signal velocity to yield a flattened P-wave signal component;
   e. Subtracting the flattened P-wave signal component from the original seismic signal data to yield interim seismic signal data having a converted wave noise component and a random noise component;
   f. Identifying a velocity of the converted wave noise component in the interim seismic signal data that would enhance flat lying events of the converted wave noise component;
   g. Applying NMO to the interim seismic signal data using the identified velocity of the converted wave noise component to yield a flattened converted wave noise component;
   h. Enhancing the flat lying events of step (g) by attenuating the random noise component of the interim seismic signal data, thereby isolating the converted wave noise component;
   i. Applying inverse NMO to the result of step (h); and
   j. Subtracting the isolated converted wave noise component from the original seismic signal data.

33. The method of claim 32, further comprising the step of enhancing the flat lying events of step (d) by attenuating the random noise component of the signal.

34. The method of claim 33, wherein the step of enhancing comprises utilizing diversity scaling to enhance the flat lying events.

35. A method of processing seismic data detected by a seismic sensor, said method comprising the steps of:
   a. Providing original seismic signal data comprised of a P-wave primary reflection signal component, a random noise component, and a converted wave noise component;
   b. Sorting the original seismic signal data into CDP order;
   c. Identifying a velocity for the P-wave signal which velocity would produce P-wave flat lying events;
   d. Applying NMO to the sorted data based on the P-wave signal velocity to generate an interim seismic signal data comprised of a corrected P-wave signal component, an overcorrected or undercorrected converted wave noise component and a random noise component;
   e. Enhancing the flat lying events after NMO by attenuating the random noise component of the interim seismic signal data;
   f. Applying inverse NMO utilizing the velocity of the P-wave signal to the remaining interim seismic signal data to yield a processed P-wave primary signal component;
   g. Subtracting the processed P-wave primary signal component from the original seismic signal data to yield a processed converted wave noise component plus random noise;
   h. Sorting processed P-wave primary signal component into receiver order;
   i. Conducting converted wave velocity analysis on the processed converted wave noise component;
   j. Applying converted wave NMO correction to the sorted results of Step H;

k. Isolating the converted wave noise component in the results of Step J by enhancing the linear lineup of the converted wave reflectors of Step J;
l. Applying inverse NMO correction to the result of Step K; and
m. Subtracting the output of Step L from the original seismic signal data.

36. A method of processing seismic data detected by a seismic sensor, said method comprising the steps of:
a. Providing original seismic signal data comprised of a P-wave primary reflection signal component, a random noise component, and a converted wave noise component;
b. Sorting the original seismic signal data into CDP order;
c. Identifying a velocity for the P-wave signal which velocity would produce P-wave flat lying events;
d. Applying NMO to the sorted data based on the P-wave signal velocity to generate an interim seismic signal data comprised of a corrected P-wave signal component, an overcorrected or undercorrected converted wave noise component and a random noise component;
e. Enhancing the flat lying events after NMO by attenuating the random noise component of the interim seismic signal data;
f. Applying inverse NMO utilizing the velocity of the P-wave signal to the remaining interim seismic signal data to yield a processed P-wave primary signal component;
g. Subtracting the processed P-wave primary signal component from the original seismic signal data to yield a processed converted wave noise component plus random noise;
h. Sorting processed converted wave noise component into receiver order;
i. Conducting converted wave velocity analysis on the processed converted wave noise component;
j. Applying converted wave NMO correction to the sorted results of Step H;
k. Isolating the converted wave noise component in the results of Step J by enhancing the linear lineup of the converted wave reflectors of Step J;
l. Applying inverse NMO correction to the result of Step K; and
m. Subtracting the output of Step L from the original seismic signal data.

* * * * *